United States Patent [19]

Kakimoto et al.

[11] Patent Number: 4,803,112
[45] Date of Patent: Feb. 7, 1989

[54] IMPACT-CUSHIONING SHEETS AND DIRECT-APPLYING RESTRAINT TYPE FLOOR DAMPING STRUCTURES USING THE SAME

[75] Inventors: Hirofumi Kakimoto; Osamu Kiso; Shinya Shimada, all of Fukuyama, Japan

[73] Assignee: Hayakawa Rubber Co., Ltd., Japan

[21] Appl. No.: 39,425

[22] Filed: Apr. 17, 1987

[30] Foreign Application Priority Data

Apr. 24, 1986 [JP] Japan ................................ 61-93466
May 21, 1986 [JP] Japan ............................... 61-114945
Jun. 16, 1986 [JP] Japan ............................... 61-138114

[51] Int. Cl.$^4$ ............................ B32B 3/00; B32B 3/30
[52] U.S. Cl. ................................. 428/161; 428/167; 428/172
[58] Field of Search ............... 428/161, 172, 167, 163

[56] References Cited

U.S. PATENT DOCUMENTS

| 3,026,224 | 3/1962 | Rogers, Jr. | 428/167 |
| 3,654,063 | 4/1972 | Blackburn et al. | 428/172 |
| 3,833,703 | 9/1974 | Joos | 428/172 X |
| 4,089,724 | 5/1978 | Bomboire | 428/172 X |
| 4,150,850 | 4/1979 | Doerfling | 428/172 X |
| 4,250,218 | 2/1981 | Tallon | 428/172 X |

Primary Examiner—Nancy A. B. Swisher
Attorney, Agent, or Firm—Parkhurst, Oliff & Berridge

[57] ABSTRACT

An impact-cushioning sheet comprises an air enclosed film base having concave portions or a perforated base material composed of fiberboard and/or foamed body and a crosslinked viscoelastic body filled in the concave portions or holes and having specified properties. A direct-applying restraint type floor damping structure is manufactured by adhering a floor component part to at least one surface of the impact-cushioning sheet.

7 Claims, 6 Drawing Sheets

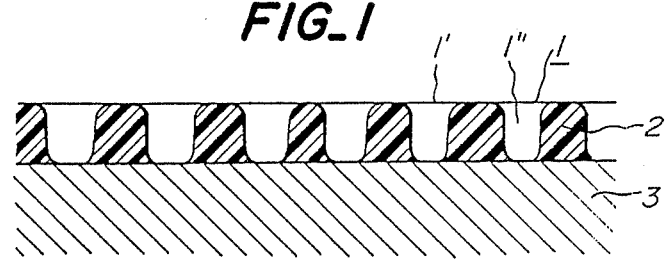
FIG_1
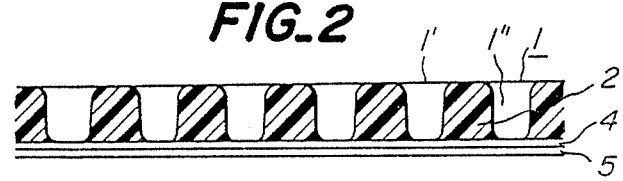
FIG_2
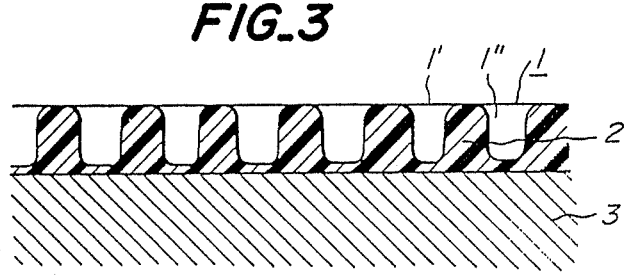
FIG_3
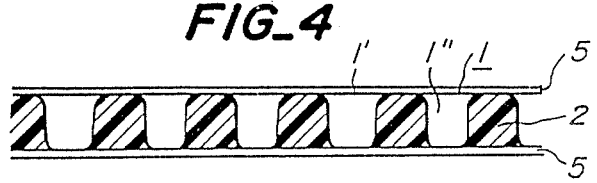
FIG_4

*FIG._5*
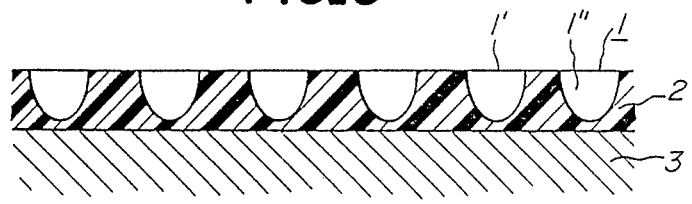
*FIG._6*
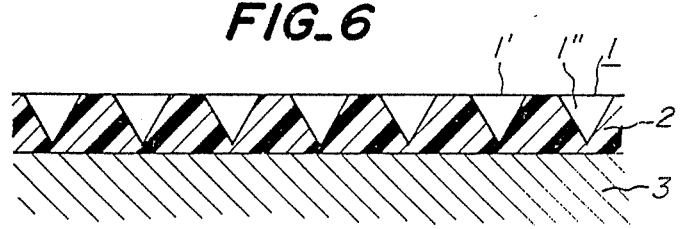
*FIG._7*
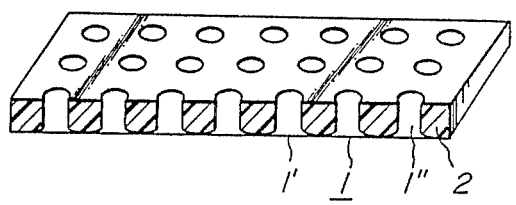
*FIG._8*
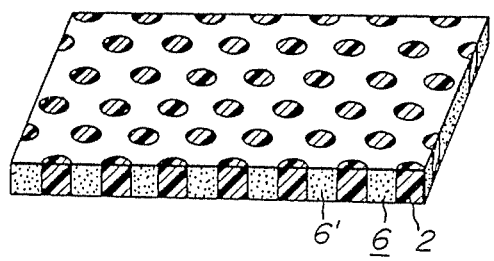

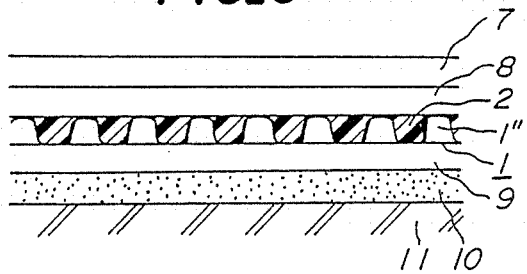
FIG_9
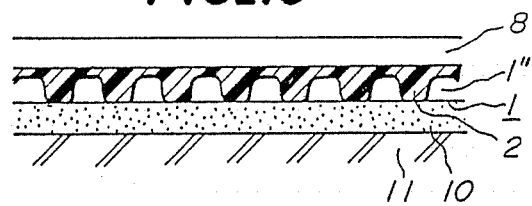
FIG_10
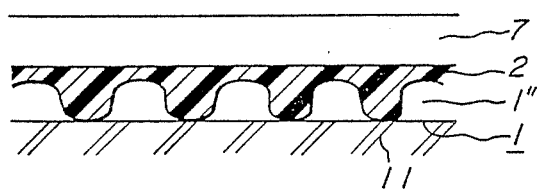
FIG_11
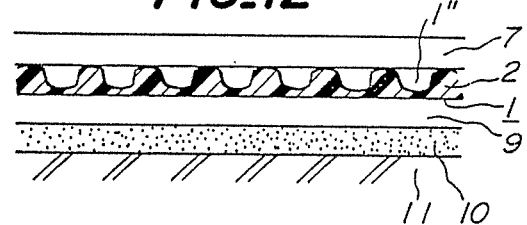
FIG_12

FIG_13
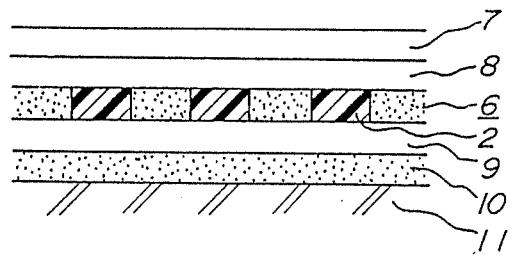
FIG_14
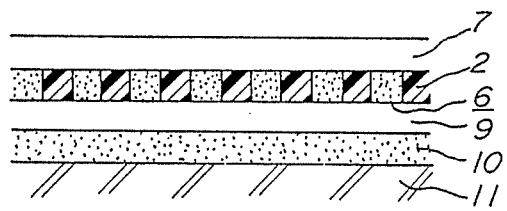
FIG_15
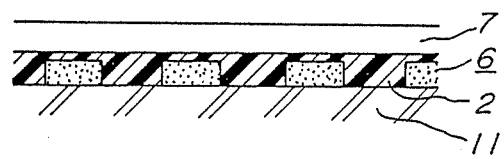
FIG_16
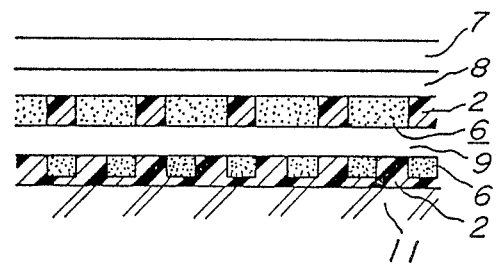

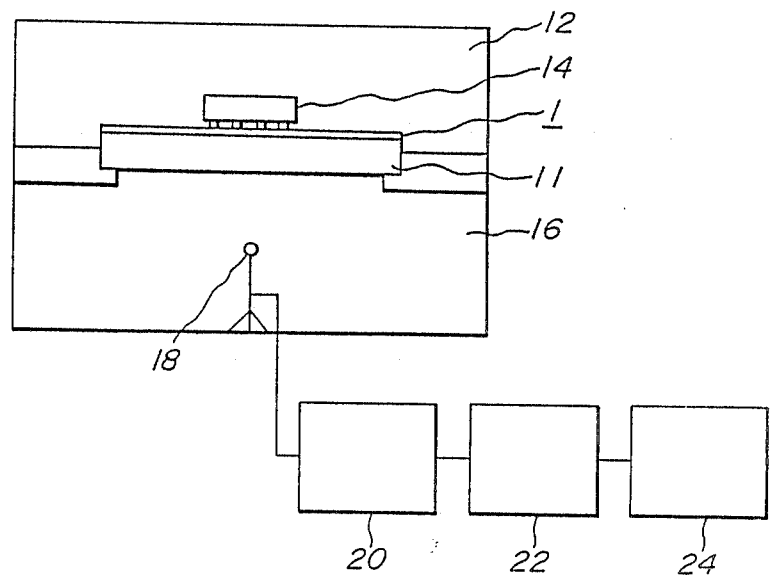
FIG_17

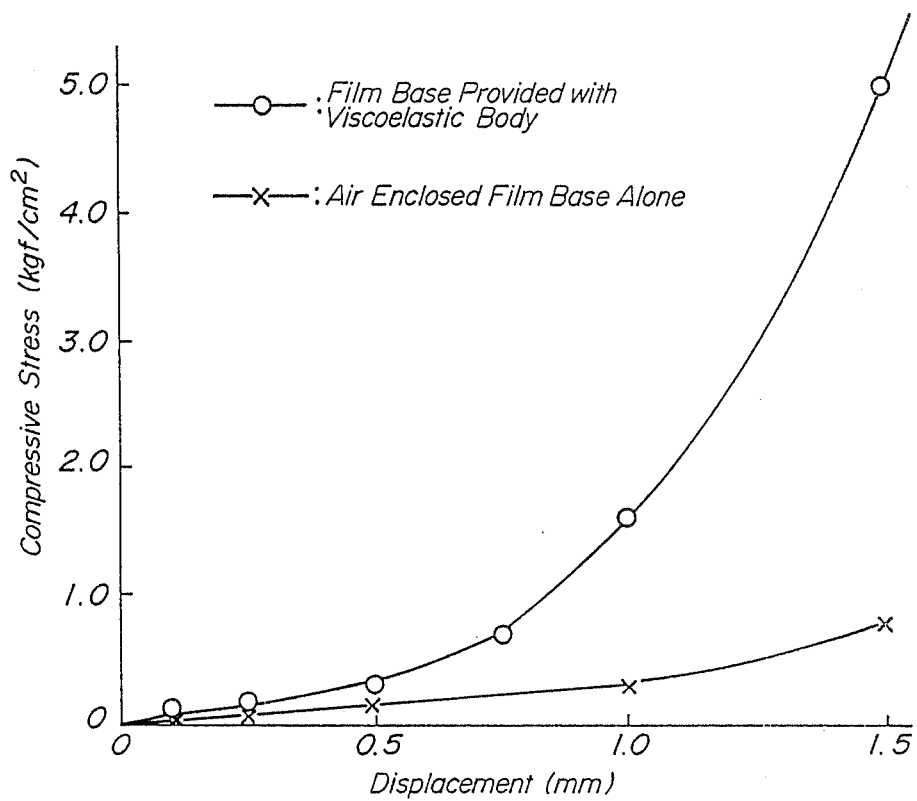
FIG_18

IMPACT-CUSHIONING SHEETS AND DIRECT-APPLYING RESTRAINT TYPE FLOOR DAMPING STRUCTURES USING THE SAME

BACKGROUND OF THE INVENTION

1. Field of the Invention

This invention relates to sheets mitigating vibration and impact noises, and more particularly to impact-cushioning sheets for use in vessels housing damageable objects, protective members for precision instruments, casings requiring vibration damping performane, covering members for piping such as ducts or the like, base members for precision instruments, damping member for audio related articles, floor damping members for buildings, vibration damping and heat insulating members, vibration damping members for vehicles and vessels, deadening members for preventing transmission of electromagnetic waves, deadening members for preventing occurrence of static electricity and the like. Furthermore, it relates to floor damping structures for direct application using such an impact-cushioning sheet.

2. Related Art Statement

Recently, the technical advance with respect to this type of impact-cushioning sheet is remarkable, and various developments having been attempted. Particularly, the attempts for preventing vibrations take large expenditures because of technical difficulties, so that it is long-awaited to develop means for preventing vibrations at low cost. That is, although the demand for preventing vibrations is relatively tolerant in the past, it is strongly demanded to provide more quiet space in machines and instruments disliking vibrations as well as buildings, vehicles and vessels with the recent high-grade trend.

Especially, it is said that the remaining subject matter in the building field is narrowed down to two points of dropwise condensation and vibration noise at the present. Lately, various countermeasures for the problem of vibration noise are taken in various places, but there are still many fields not providing a sufficient effect for the prevention of vibration noises because of technical difficulties. For example, such fields include the building field using floor members. Particularly, various studies with respect to the floor member have been made, but floor members developing good noise controlling performances are not yet obtained up to date.

As to the floor member, residents demanding the use of a woody floor member are increasing because the woody floor members have some merits such that the cleanliness is held, and the living of mildews and harmful insects such as acari, and so on, is difficult, and the color tone is sober. However, the woody floor member has only a demerit that floor impact sounds such as walking sounds, falling sounds and the like can not completely be mitigated, so that the use of a woody floor member as an upstairs floor is unfavorable considering annoyances to downstairs residents.

Therefore, it is strongly demanded to develop floor members having an improved sound deadening performance.

SUMMARY OF THE INVENTION

Under the above situations, the inventors have made various studies with respect to members having a low cost and an excellent deadening effect and found that an air chamber forming a convex portion of closed-cell structure and viscoelastic body, particularly crosslinked viscoelastic body filled in a concave portion, between the convex portions are utilized to provide impact-cushioning sheets having not only improved vibration damping and impact cushioning performances inherent to the air chamber and viscoelastic body, but also improved compression properties and compressive restoring property developed by the synergistic action of the air chamber and viscoelastic body, and as a result, the invention has been accomplished.

That is, the impact-cushioning sheets according to the invention utilize the properties of air chambers and the properties of viscoelastic body, i.e. impact cushioning properties, vibration damping properties and compression properties in one layer are at maximum.

Furthermore, the inventors have found that direct-applying restraint type floor damping structures having an improved deadening performance against floor impact sounds can be obtained by adhering a floor component part to at least one surface of the above impact-cushioning sheet.

According to a first aspect of the invention, there is the provision of an impact-cushioning sheet comprising a film base constituted by alternately arranging convex portions with air enclosed therein and concave portions made only of a film, and a crosslinked viscoelastic body filled in the concave portions of the film base and/or over the whole surface of the film base and obtained by curing a viscoelastomeric substance at room temperature; said crosslinked viscoelastic body retaining its shape even when being warmed at 80° C. and having a hardness at 20° C. of not more than 50 as measured by a C-type hardness tester according to a standard SRIS-0101 in The Society of Rubber Industry, Japan, wherein a ratio of total air volume in the convex portions of the film base to total viscoelastic body volume filled in the concave portions of the film base is within a range of convex portion: concave portion = 2:8 ~ 8:2 and a height of the convex portion is not more than 6 mm.

According to a second aspect of the invention, there is the provision of an impact-cushioning sheet comprising a perforated base material composed of fiberboard or foamed body or a laminate thereof having a hole area of 0.03 ~ 13 $cm^2$ and a thickness of 2 ~ 20 mm and a crosslinked viscoelastic body filled in the hole portions and/or over the whole surface of the base material and obtained by curing a viscoelastomeric substance at room temperature; said crosslinked viscoelastic body retaining its shape even when being warmed at 80° C. and having a hardness at 20° C. of not more than 50 as measured by a C-type hardness tester according to a standard SRIS-0101 in The Society of Rubber Industry, Japan, wherein a ratio of total hole area to the whole area of the base material other than the hole portions is within a range of 2:8 ~ 8:2.

Third and fourth aspects of the invention provide direct-applying restraint type floor damping structures obtained by adhering a floor component part to at least one surface of the impact-cushioning sheet according to the first and second aspects of the invention, respectively.

BRIEF DESCRIPTION OF THE DRAWINGS

The invention will be described with reference to the accompanying drawings, wherein:

FIG. 1 is a schematically sectional view of a first embodiment of the impact-cushioning sheet according to the invention, wherein a plastic film sheet filling the crosslinked viscoelastic body in concave portions is adhered to a surface of a member to be impacted;

FIG. 2 is a schematically sectional view of a second embodiment of the impact-cushioning sheet according to the invention, wherein a restraint member is bonded to a surface of a plastic film sheet through an adhesive;

FIG. 3 is a schematically sectional view of a third embodiment of the impact-cushioning sheet according to the invention, wherein a plastic film sheet covered with a crosslinked viscoelastic body over the whole surface thereof is adhered to a surface of a member to be impacted;

FIG. 4 is a schematically sectional view of a fourth embodiment of the impact-cushioning sheet according to the invention, wherein restraint members are bonded to upper and lower surfaces of a plastic film sheet filling a crosslinked viscoelastic body in concave portions, respectively;

FIGS. 5 and 6 are schematically sectional views of fifth and sixth embodiments of the impact-cushioning sheet according to the invention, wherein the shape of the convex air chamber is semicircular or conical, respectively;

FIGS. 7 and 8 are perspective views of other embodiments of the impact-cushioning sheet according to the invention, respectively;

FIGS. 9 to 16 are schematically sectional view of various embodiments of the direct-applying restraint type floor damping structure according to the invention, respectively;

FIG. 17 is a schematic view of an apparatus for measuring floor impact sounds according to the invention; and FIG. 18 is a graph showing an influence of a crosslinked viscoelastic body according to the invention onto compression properties.

DESCRIPTION OF THE PREFERRED EMBODIMENTS

As is well-known, there are foamed bodies such as foamed polystyrol, foamed polyurethane and so on; corrugated boards, hollow plastic laminated boards, air enclosed plastic sheets and the like as an impact-cushioning member. It is known that these members are simply subjected to compression deformation even at a small stress to easily mitigate shocks. However, they have a drawback that the restoring is difficult or that breakage is caused once they are subjected to compression deformation because the restoring force or mechanical strength is weak.

And also, shock-absorbing rubber, rubber vibration isolator, non-resilient rubber and the like are known as an impact-cushioning member. However, they have drawbacks that a vulcanization step is usually required which increases the cost, and the specific gravity is large which increases the weight, and the modulus of elasticity is large which insufficiently absorb impact energy or vibration energy. Furthermore, there are sound deadening members such as insulators used in audio apparatus and the like, which also have drawbacks that the height should be sufficiently taken for containing a large amount of air, and the structure is complicated, and the cost is expensive. Moreover, it is known that members which easily deform even at a small compressive stress, such as felts and so on, simply mitigate floor impact sounds as the usually used countermeasure for the prevention of floor impact sound. However, such members are too large in the compression deformation, so that they have a fatal drawback that when they are used as a floor member requiring a smooth finish surface as in the woody floor the strain is caused by merely placing, for example, a furniture on the member to lose the smoothness. Therefore, the countermeasure for mitigating floor impact sound is actually performed by combining some of compressed glass wool, asbestos, century board, rubber plate, inorganic plate, plywood and the like, or by wafting the above combination from a floor board, or by disposing a sound absorbing material in a space between floor board and ceiling, or by suspending a ceiling through a rubber vibration isolator.

In the aforementioned conventional countermeasures, the raw material part number is large and the cost of raw material is high. Further, the material loss in the application is large and the application step number is large to bring about a high risk of causing a difference in the mitigating performances of floor impact sound between workers. Moreover, the total thickness of floor members used for mitigating floor impact sounds becomes much thicker, so that if it is intended to make the eaves height equal to that of the existing building, it is obliged to narrow the living space or reduce the floor number, while if it is intended to hold the same living space without changing the floor number, the increment of eaves height rebounds to the increase of construction cost in the building.

The inventors have repeated many trials and errors with respect to the development of impact-cushioning sheets solving the aforementioned drawbacks and being thin at a low cost and having an improved impact energy mitigating performance and an easy workability as well as direct-applying restraint type floor damping structures using the above impact-cushioning member and cpable of mitigating floor impact sounds even through woody floor finishing, and found that the combination of a crosslinked viscoelastic body with a film base containing air enclosed portions or a perforated base material made from fiberboard and/or foamed body not only develops a performance of repeatedly absorbing a large impact energy but also solves the drawbacks produced when using the crosslinked viscoelastic body, film base or perforated base material alone without damaging the excellent impact cushioning properties.

When the crosslinked viscoelastic body is used alone, it has drawbacks in that the cost becomes unfavorably high for use as an ordinary impact-cushioning sheet, and the production equipment and the like are largely restricted in order to enhance the accuracy of thickness after solidification or curing. Further, when the crosslinked viscoelastic body is applied to a direct-applying restraint type floor damping structure, a fairly large amount of a viscoelastomeric substance is used for conducting the crosslinking reaction between two restraint plate members. If the amount of viscoelastomeric substance used is small, large caves are apt to be produced in the crosslinked viscoelastic body to cause the scattering of product quality. On the other hand, when the previously plate-shaped viscoelastic body is applied to the restraint member, the thickness accuracy is insufficient unless the size is specified. Further, the blocking of the crosslinked viscoelastic body or the like is apt to be caused, whereby the application step number becomes very large and the cost becomes undesirably higher.

When the film base containing the air enclosed portions is used alone, since there is no material for protecting the thin film of the convex portion as previously mentioned, if the film base is locally pressurized or is subjected to a relatively small impact force even over a wide area, it is easily broken to lose the function as an impact-cushioning sheet. If the convex portions of the film base are covered with a thin film, the load bearing property is somewhat improved as compared with the film base alone, but the breakage is caused even by a relatively small impact force and the impact cushioning properties are not completely developed after the breakage. Moreover, corrugated plastic boards having air enclosed portions are known as an impact-cushioning sheet, but they have fatal drawbacks as a floor member that they are not restored due to the buckling at an unexpectedly small stress when being subjected to compression loading because the rigidity as a whole is increased by making the thickness of surface film thick, and that the performance for mitigating floor impact sounds is poor.

When the base material made of fiberboard and/or foamed body is used alone, it is easily subjected to compression deformation even at a small stress to exhibit an excellent effect of mitigating floor impact sounds, but the restoring performance is poor and the compression deformation strain is too large, so that this base material has a fatal drawback that when it is applied to a floor member requiring a smooth finished surface as in the woody floor member, the strain is produced only by placing a furniture to lose the smoothness. Further, the base material has drawbacks that the moisture vapor resistance is usually poor and the living of mildews and acari is easy. Particularly, when the foamed body is used as a base material, echo sound tends to become undesirably large in a room subjected to floor impact considering annoyance of echo sound to adjacent room.

The reason why the impact-cushioning sheets and direct-applying restraint type floor damping structures consisting mainly of the film base according to the invention are excellent in the impact cushioning properties is based on the fact that since the air enclosed portion is compression-deformable as an air bag and the crosslinked viscoelastic body filled in the concave portions adheres to the convex portions of the film base and restrains these convex portions in three dimensions, the performance of absorbing impact energy is more increased by the increase in deformation of the convex portion forming the air bag and deviation deformation to the crosslinked viscoelastic body in addition to the impact energy absorbing performance of the crosslinked viscoelastic body itself. As to the compression properties, the convex portions as an air bag are compressed to more compress the crosslinked viscoelastic body when being subjected to impact, whereby the film base is easily deformed at a very small displacement. While, when the film base is subjected to compression above a given loading, the displacement more than is necessary is avoided by the action of stress of compressed air in the convex portion and compressive stress of the crosslinked viscoelastic body. When the compression loading is removed, the deformed film base can rapidly be restored by the synergistic action of the restoring force of the crosslinked viscoelastic body and the restoring force of the compressed air in the convex portion.

In general, the crosslinked viscoelastic body has a tendency of varying the hardness in accordance with the change of temperature. In the film base according to the invention, however, the decrease of compression strength due to the reduction of hardness in the crosslinked viscoelastic body at high temperature can be suppressed by the expansion of air, while the increase of compression strength due to the increase of hardness in the crosslinked viscoelastic body at low temperature can be suppressed by the contraction of air, so that the film base is less in the variation of performances due to the change of temperature, which is a merit as an impact-cushioning sheet.

Since one surface of the film base according to the invention is a film, when it is subjected to a working, the handling operation is very easy and the working time or operation time is effectively shortened. Furthermore, the continuous working is possible in the production of the film base, which is advantageous in view of the cost. Moreover, when the film base is applied to a surface to be impacted, the performances such as impact resistance, vibration damping property, heat insulation property and the like are given to such a surface only by bonding the film base to the surface through the bonding force of the crosslinked viscoelastic body itself or an adhesive. No crosslinked viscoelastic body is necessary in the air enclosed portion, resulting in the reduction of the cost.

When using the perforated base material made of fiberboard and/or foamed body according to the invention, since the crosslinked viscoelastic body is filled in the holes formed in the base material, the excellent effect of mitigating floor impact sounds is considered to be produced by absorbing impact energy through ease of compression deformation of the base material, compressive stress properties which require a large compression force for deforming the crosslinked viscoelastic body by a given quantity, restraint effect of the crosslinked viscoelastic body to floor members at upper and lower surfaces of the base material when being subjected to impact, and deviation shearing stress thereof.

Particularly, in case of the perforated base material made of the fiberboard, the viscoelastomeric substance can be impregnated in the whole surface of the fiberboard or around the holes formed in the fiberboard, whereby the bonding force and reinforcing effect as well as moisture vapor resistance can largely be improved. Further, the living of mildew and acari can be prevented by adding a mildewproofing agent or the like to the crosslinked viscoelastic body. Moreover, the compression restoring property, which is a weakpoint in the fiberboard or foamed body, can be improved by the use of the crosslinked viscoelastic body. Since the cost of the fiberboard or foamed body is cheaper than that of the crosslinked viscoelastic body, the production cost of the base material can largely be reduced as compared with the use of the crosslinked viscoelastic body alone. And also, the sheeting of the base material and the continuous working are possible, so that the operation efficiency is considerably improved and the material loss is lessened.

Then, the sectional structure of each of the impact-cushioning sheets and direct-applying restraint type floor damping structures according to the invention will be described in detail with reference to the accompanying drawings.

As shown in FIGS. 1 and 3, a plastic sheet 1 comprising a plastic film 1' having a plurality of closed convex air chambers 1" and a crosslinked viscoelastic body 2 filled in concave portions between the convex portions of the film and/or over the whole surface of the film is used as an impact-cushioning sheet and directly applied to a surface of a member to be vibrated or impacted. Alternatively, as shown in FIG. 2, a metal foil, plastic sheet, paper, nonwoven fabric or the like as a restraint member 5 is previously adhered to one surface of the above plastic sheet 1 through an adhesive layer 4 and then applied to the surface of the member to be vibrated or impacted. In the latter case, the film surface of the plastic sheet filled with the crosslinked viscoelastic body or the restraint member may be appropriately applied to the surface of the member in accordance with the use purpose. In order to enhance the vibration damping properties, it is desirable that the restraint members 5 are applied to the upper and lower surfaces of the plastic sheet as shown in FIG. 4. If it is required to have a very flexible touch surface, a flocked member, a rubber sheet or the like may be adhered to the plastic sheet as a restraint member. FIGS. 5 and 6 show that the shape of the convex air chamber 1'' in the plastic film 1' is semicircular and triangular, respectively. FIG. 7 is a perspective view of the plastic sheet 1 used in the embodiments of FIGS. 1-4. Further, FIG. 8 is a perspective view of another embodiment of the impact-cushioning sheet according to the invention, wherein the crosslinked viscoelastic body 2 is filled in holes of a foamed body 6' as a perforated base material 6.

As the direct-applying restraint type floor damping structure, there are various ones as shown, for example, in FIGS. 9 to 16, each of which is applied to a floor concrete slab 11. In these figures, each of numerals 7, 8 and 9 is a relatively high rigidity plate, as a restraint member, and numeral 10 is a foamed polyethylene as an irregularity absorbing member. As shown in FIGS. 11 and 15, the film base 1 or the base material 6 may directly be adhered to the floor concrete slab 11 so as to develop the irregularity absorbing performance in addition to the effect of mitigating floor impact sounds. Moreover, the above effect becomes larger when using two base materials 6 as shown in FIG. 16.

According to the invention, the crosslinked viscoelastic body is obtained by the curing reaction of reactive-type viscoelastomeric substance at a liquid state at room temperature and is in response to change of temperature over a wide temperature range. Particularly, the crosslinked viscoelastic body obtained by using a polymer having a room temperature reactivity has advantages that energy required for heating and drying in the production step is useless, and an equipment required for recovering solvent in the drying step is not required, and the corrosion due to moisture and the like is not caused in the production equipment. Moreover, the crosslinked viscoelastic body according to the invention is necessary to satisfy the requirements that the shape is retained when being warmed at 80° C. and the hardness at 20° C. is not more than 50 as measured by a C-type hardness tester according to a standard SRIS-0101 in The Society of Rubber Industry, Japan. As a reactive substance capable of satisfying such requirements, mention may be made of a combination of liquid rubber and crosslinking agent each having the functional groups as shown in the following Table 1. As the liquid rubber, it is particularly preferable to use polybutadiene having hydroxyl group in the terminal of main chain, hydrogenated polybutadiene, butadiene-nitrile copolymer, butadiene-styrene copolymer, isoprene, polyether polyol, polyester polyol, urethaneacryl polyol, aniline derived polyol and the like alone or in admixture considering the easiness of controlling the curing rate of room temperature reactivity, cost, availability and the like. As the crosslinking agent, isocyanate series crosslinking agents are preferably used, wherein it is necessary to have two or more isocyanate groups per one molecule, a typical example of which includes toluylene diisocyanate, diphenylmethane diisocyanate, hexamethylene diisocyanate, isophorone diisocyanate, prepolymer having isocyanate groups at both terminals and a mixture thereof. Moreover, the isocyanate series crosslinking agent may be used together with a plasticizer in view of compounding ratio and/or viscosity. In the latter case, the plasticizer is necessary to be a dehydrate not reacting with the isocyanate group.

TABLE 1

| Functional group of liquid rubber | Functional group of crosslinking agent |
| --- | --- |
| —OH | —NCO |
| —COOH | 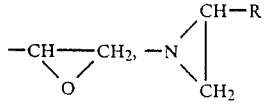 |
| | metal oxide, —OH, —NCO |
| —SH | 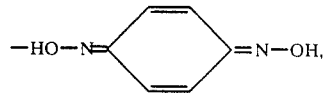 |
| | metal oxide, —NCO, peroxide |
| —NR₂ | polyvalent halogen compound (—Br) |
| 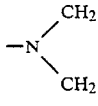 | —COOH, polyvalent halogen compound |
| 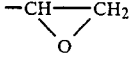 | —NH₂, —OH, —COOH, acid anhydride |
|  | 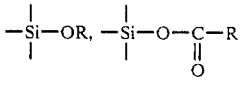 |
| —NCO | —OH, —NH₂, —NHR, —COOH, —SH |
| —CH=CH₂ |  |
| | (metal hydrogen compound) |
| —Br | —NR₂, —NHR, —NH₂, metal oxide |
| 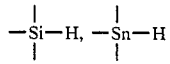 | —NH₂ |

Although the crosslinked viscoelastic body according to the invention is obtained only by the reaction of the aforementioned combination at room temperature, it can widely and stably be produced by adding various additives in view of cost, workability and properties.

As the additive, mention may be made of plasticizer, filler, bituminous substance, tackifier, antioxidant, mildewproofing agent, flame retarder, catalyst, pigment, surfactant, coupling agent, foaming agent, anti-foaming agent and the like.

The plasticizer is compounded for regulating the viscosity, the workability and the properties of the crosslinked viscoelastic body and providing the flame retardant properties, and includes naphthenic oil, paraffinic oil, aromatic oil, castor oil, cottonseed oil, pine oil, tall oil, phthalic acid derivative, isophthalic acid derivative, adipic acid derivative, maleic acid derivative, liquid rubber having no functional group and a mixture thereof. If the flame retardant properties are required, halgen compounds and/or phosphous compounds can be used as a plasticizer.

The bituminous substance includes straight asphalt, blown asphalt, tar and the like. Moreover, the bituminous substance may previously be modified with the tackifier or plasticizer for providing the desirable tackifier or plasticizer for providing the desirable crosslinked viscoelastic body.

As the tackifier, use may be made of natural resin, rosin, modified rosin, derivatives of rosin and modified rosin, polyterpene resin, modified terpene, aliphatic hydrocarbon resin, cyclopentadiene resin, aromatic petroleum resin, phenolic resin, alkylphenylacetylene resin, xylene resin, coumarone-indene resin, vinyltoluene-α-methylstyrene copolymer and a mixture thereof.

The filler is effective for improving the vibration damping properties, sound insulating properties and flame retardant properties, and is used for the purpose of regulating the compounding ratio of primary ingredient to crosslinking agent and the viscosity, and for reducing the compounding cost. As the filler, use may be made of ones usually used in rubber and paint fields, an example of which includes scaly inorganic powder such as mica, graphite, vermiculite, talc, clay and the like; high specific gravity fillers such as ferrite, metal powder, barium sulfate, lithopone and the like; general-purpose fillers such as calcium carbonate, finely divided silica, carbon, magnesium carbonate, aluminum hydroxide, asbestos and the like. Further, antimony trioxide, borax and the like may be used as a filler for providing the flame retardant properties.

Since the hardness of the crosslinked viscoelastic body largely affects the compressive stress, impact cushioning force and restoring properties of the final product, it is necessary to properly select the aforementioned materias in accordance with the use purpose in the production of the crosslinked viscoelastic body.

Then, the air enclosed film base constituting the impact-cushioning sheet is sufficient to make general-purpose articles usually used as a packaging material, but in this case it is necessary that a ratio of air volume in the hollow convex portion to volume of crosslinked viscoelastic body filled in the concave portion of the film base is within a range of convex portion:concave portion=2:8~8:2. When the ratio of convex portion is smaller than 2:8, the cost of raw material undesirably increases and the restoring property becomes poor, while when it is larger than 8:2, the cost of raw material reduced but the risk of breaking air chamber becomes higher. Further, the thickness of the film forming the air enclosed chamber is desirable to be about 20–100 μm. Moreover, the height of the convex portion as an air chamber is not more than 6 mm, preferably 2–4 mm, and the volume of air per one convex portion is not more than 10 cc, preferably 0.3~5 cc.

Furthermore, when the crosslinked viscoelastic body is filled in the concave portions of the film base, it may be applied so as to completely cover the top surface of the convex portion, but in this case, the thickness extending from the top surface of the convex portion is preferably not more than 1 mm from a viewpoint of the cost. On the other hand, when the height of the crosslinked viscoelastic body filled is lower than ¾ of the height of the convex portion, unless a great amount of compression is applied from the beginning, the crosslinked viscoelastic body is not closely adhered to the outer surface of the convex portion, and consequently the restraining effect is not obtained and the bonding strength is insufficient and the film forming the convex portion is apt to be broken.

As the material of the film, use may be made of polyethylene, polypropylene, nylon, polyester, vinyl chloride, vinylidene chloride and so on. Among them, polyethylene and polypropylene films are commercially available as a general-purpose product, while vinylidene chloride film is excellent in the resistance to gas permeation. The shape of the air enclosing convex portion may be columnar, prismatic, semicircular, ellipsoidal or the like. Moreover, when a conductive film as disclosed in Japanese Patent laid open No. 60-105,530 is used as a film base, a conductive impact-cushioning sheet can be provided, which may be used as an antistatic vibration damping member when being applied to a surface of a member to be vibrated or impacted. And also, when a metal foil is used as a restraint member 5 shown in FIGS. 2 and 4, the resulting impact-cushioning sheet can be used as an electromagnetic wave shielding member possessing the vibration damping properties.

As the restraint member 5, there are a thin sheet of a metal selected from iron, copper, aluminum, stainless steel, brass, galvanized steel, zinc and the like; plastic film sheets of polyester, vinyl chloride, polyethylene, polypropylene, nylon, vinylidene chloride and ethylene-vinyl acetate copolymer; vulcanized rubber sheet; unvulcanized rubber sheet; corrugated board; fabrics such as felt and the like; unwoven fabric using nylon, polyester, polypropylene, polyethylene, polyurethane or glass fiber; natural fibers such as cotton, hemp and the like; synthetic fibers made from nylon, urethane, polypropylene, acryl, polyester, polyamide, polyimide or the like; woody members such as veneer, plywood, cork board, particle board and the like; inorganic members such as wood chip cement plate, fiberboard, pulp cement plate, excelsior cement plate, flexible plate, asbestos cement plate, asbestos cement perlite plate, asbestos cement calcium silicate plate, plasterboard and the like. Such a restraint member may be used irrespectively of decorative finishing and the presence of holes. Further, the thickness of the restraint member is desirable to become thinner in order to reduce the total thickness of the resulting assembly as far as possible. Moreover, it is favorable to use a material having a high Young's modulus when the use purpose is not restricted.

As the fiberboard constituting the base material, mention may be made of synthetic fibers such as nylon, polyester, urethane, acryl, polypropylene, polyethylene and the like; natural fibers such as wool, cotton, hemp and the like; inorganic fibers such as glass, asbestos and the like; metallic fibers such as aluminum, lead and the like; and a mixture thereof. Furthermore, such fiberboard may be used together with a binder. As the foamed body constituting the base material, mention may be made of foams of urethane, polyethylene, polypropylene, styrene, vinyl chloride, ethylene-vinyl acetate copolymer, chloroprene, ethylene-propylene copolymer, natural rubber, butyl rubber, styrene-butadiene rubber, butadiene rubber and so on. The foamed body may have a specified size or a continuous size, but the use of continuous foamed body is preferable in view of the production efficiency. Moreover, the foamed body may be produced by stiffening pulverized products of at least one foam with a binder. In addition, at least one fiberboard may properly be laminated on at least one foamed body as a base material.

In any case, the base material made of the fiberboard and/or foamed body is necessary to be subjected to perforating in order to fill the crosslinked viscoelastic body in holes of the base material. In this case, the area of hole is 0.03 cm$^2$ ~ 13 cm$^2$, preferably 0.2-5.0 cm$^2$. If the hole area is less than 0.03 cm$^2$, it is required to reduce the viscosity of the viscoelastomeric substance before the curing reaction as far as possible and consequently the viscoelastomeric substance is impregnated into the base material during the curing to hardly control the thickness of the crosslinked viscoelastic body formed in the hole of the base material. While, if it exceeds 13 cm$^2$, the tensile strength of the base material becomes weak to easily cause the breakage of the base material at the production step, and it is apt to cause the difference of compression properties between the base portion and the crosslinked viscoelastic body at the floor end when using as a floor member.

The shape of the hole may be circular, ellipsoidal, triangular, rectangular, polygonal or slit.

The thickness of the base material is within a range of 2 mm 20 mm, which is determined by the density and diameter of fiber in case of the fiberboard and the expansion ratio and material in case of the foamed body. When the thickness is less than 2 mm, the impact cushioning effect is small, while when it exceeds 20 mm, the amount of the crosslinked viscoelastic body used undesirably increases from a viewpoint of the cost and the compression strain becomes too large.

The floor component parts used in the direct-applying restraint type floor damping structure according to the invention are as follows.

As the restraint member 7, mention may be made of woody floor finish member, vinyl chloride series floor finish member, cork tile and so on, which are presently used as a floor finish member. As the woody floor member, mention may be made of single-layer floorings such as flooring board, flooring block and mosaic parquet; composite floorings such as natural wood decorated composite flooring, special worked decorative composite flooring, natural wood decorated composite block and special worked decorative composite block; and floorings obtained by laminating cork on strip or veneer. In this case, it is favorable to reduce the thickness of the floor member in order to mitigate floor impact sounds.

As the restraint members 8, 9, there are the aforementioned woody floor member, plywood, compressed paper, plastic sheet, metal thin sheet, particle board, wood chip cement plate, fiberboard, pulp cement plate, excelsior cement plate, flexible plate, asbestos cement plate, asbestos cement perlite plate, asbestos cement calcium silicate plate, plasterboard and so on. These members may be used in the plate-like form irrespectively of decorative working and the presence of holes, and the thickness thereof is desirable to become thinner in order to reduce the total thickness of the floor damping structure as far as possible. Further, sheet-like, film-like and cloth-like members may be used as the eestraint member 8, 9, an example of which includes films and sheets of vulcanized rubber, unvulcanized rubber, vinyl chloride, polyethylene, polypropylene, nylon, polyester, vinylidene chloride, ethylene-vinyl acetate copolymer and the like, unwoven fabrics using nylon, polyester, polypropylene, polyethylene or glass fiber, and cloths made from natural fiber such as cotton or hemp and/or synthetic fiber such as nylon, urethane, polypropylene, acryl or polyester fiber. In case of using the fiber, it is desirable that the thickness of the cloth is made as thin as possible in order to reduce the compression strain.

The following examples are given in illustration of the invention and are not intended as limitations thereof.

EXAMPLES 1-4, COMPARATIVE EXAMPLES 1-3

A liquid rubber composition having a compounding recipe as shown in the following Table 2 was mixed with a crosslinking agent as shown in Table 2, and then the resulting mixture was filled in concave portions of a film base having a ratio of convex portion to concave portion as shown in Table 2 and cured at room temperature and dried to form an impact-cushioning sheet.

The crosslinked viscoelastic body of Example 1 was obtained by curing the liquid rubber composition containing hydroxyl-terminated polybutadiene, asphalt and plasticizer as a fundamental ingredient through a crosslinking agent having more than two isocyanate groups per one molecule at room temperature, and exhibited excellent compression properties and impact resistance. The impact-cushioning sheet of Example 1 develops satisfactory performances together with a woody floor finish member.

The crosslinked viscoelastic body of Example 2 was obtained by using a viscoelastomeric substance containing urethane as a fundamental ingredient, and exhibited excellent compression properties and impact resistance. Further, the impact-cushioning sheet of Example 2 can sufficiently be used even at high temperature and develops satisfactory performances together with a woody floor finish member.

The crosslinked viscoelastic body of Example 3 was obtained by using an emulsion of a viscoelastomeric substance and exhibited excellent compression properties and impact resistance. The impact-cushioning sheet of Example 3 develops satisfactory performances together with a woody floor finish member.

The impact-cushioning sheet of Comparative Example 1 was composed of only the film base having convex and concave portions without using the crosslinked viscoelastic body. This sheet has a very low impact resistance and poor restoring property and can not achieve the object of the invention.

In Comparative Example 2, the ratio of convex portion to concave portion was 1:9, which was outside the range defined in the invention, so that the restoring property was somewhat poor and the amount of the crosslinked viscoelastic body used was increased thus the material cost.

In Comparative Example 3, the ratio of convex portion to concave portion was 9:1, which was also outside the range defined in the invention, so that the restoring property and impact resistance were poor and the risk of causing the breakage of convex air chambers in the film base became high.

TEST METHODS

1. A sample for the measurement of hardness was prepared by pouring the viscoelastomeric substance in a mold of 12 mm thickness×120 mm width×100 mm length. After the curing was carried out at room temperature for 7 days and at 50° C. for 7 days, the hardness was measured at 20° C. according to a standard SRIS-0101 in The Society of Rubber Industry, Japan.

2. Shape retention at 80° C.

A sample of 30 mm height×50 mm diameter was prepared in the same manner as described in the above item 1 and left to stand at 80° C. through a releasing paper under a load of 500 g for 24 hours and then at room temperature for 4 hours after the removal of loading. Thereafter, the degree of deformation in the sample was visually observed. The shape retention was evaluated by mark ○ wherein the edge portion of the sample was sharp and less in the deformation and mark × wherein the edge portion was dull and large in the deformation.

3. Measurement of floor impact sounds

The floor impact sounds were measured by means of an apparatus shown in FIG. 17 as follows.

The impact-cushioning sheet 1 was applied onto a floor concrete slab 11 of 150 mm in thickness in a vibration applying chamber 12. Then, vibrations were applied to the impact-cushioning sheet 1 through a tapping machine 14 to thereby generate floor impact sound, which was received by a microphone 18 in a sound receiving chamber 16. The received sound was measured through a precision sound level meter 20, a frequency analyzer 22 and a level recorder 24 according to JIS A-1418, and the measured result was evaluated by sound insulation grade according to JIS A-1419.

4. Restoring property

The impact-cushioning sheet of 4 mm in thickness was cut out into a sample of 50 mm width×50 mm length. The resulting sample was covered at the upper and lower surfaces with releasing papers and compressed up to 50% at a rate of 2 mm/min by means of a compression testing machine and held at this state for 30 minutes, and then the loading was removed. The restoring property after 10 minutes of loading removal was checked and evaluated by mark ○ showing the restoring property of not less than 95% and mark × showing the restoring property of less than 90%.

5. Compression properties

Each of the air enclosed film base and the film base provided with crosslinked viscoelastic body as an impact-cushioning sheet was subjected to a compression test at a rate of 2 mm/min by means of a compression testing machine, and then the displacement and compressive stress were measured to obtain results as shown in FIG. 18. As seen from FIG. 18, when the displacement is small the compression loading is hardly required irrespectively of the presence of the crosslinked viscoelastic body, while when the displacement is large, a large compression loading is required in the case of the film base provided with the crosslinked viscoelastic body. In other words, it can be said that the film base provided with the crosslinked viscoelastic body has ideal compression properties as an impact-cushioning sheet.

6. Impact resistance

A laminate of an impact-cushioning sheet of 4 mm in thickness and a plywood of 3 mm in thickness was cut out into a sample of 30 mm×30 mm, which was subjected to an impact test by means of an impact deformation testing machine according to a method B of JIS K-5400, whereby impact conditions for breaking air chamber were measured.

TABLE 2

|  | Example 1 | Example 2 | Example 3 | Comparative Example 1 | Comparative Example 2 | Comparative Example 3 |
|---|---|---|---|---|---|---|
| (part by weight) | | | | | | |
| <Liquid rubber composition> | | | | | | |
| Hydroxyl-terminated liquid polybutadiene rubber*1 | 100 | — | — | — | 100 | 100 |
| Polyether polyol*2 | — | 100 | — | — | — | — |
| Acrylic emulsion*3 | — | — | 100 | — | — | — |
| Rubber-asphalt emulsion*4 | — | — | 45 | — | — | — |
| Straight asphalt 60/80 | 100 | — | — | — | 100 | 100 |
| Plasticizer A*5 | 200 | — | — | — | 200 | 200 |
| Plasticizer B*6 | — | 200 | — | — | — | — |
| Tactifier*7 | 50 | 30 | — | — | 50 | 50 |
| Calcium carbonate | — | 57 | — | — | — | — |
| Mica | 50 | — | — | — | 50 | 50 |
| Powdery rubber (30 mesh) | — | — | 100 | — | — | — |
| Catalyst*8 | — | 3 | — | — | — | — |
| <Crosslinking agent> | | | | | | |
| MDI | 12 | — | — | — | 12 | 12 |
| Isocyanate + prepolymer*9 | — | 130 | — | — | — | — |
| Aziridine compound*10 | — | — | 5 | — | — | — |
| Film base ratio of convex portion to concave portion | 5/5 | 5/5 | 5/5 | 5/5 | 1/9 | 9/1 |
| Hardness SRIS 0101 (20° C.) | 3 | 10 | 40 | — | 3 | 3 |
| Shape retention at 80° C. | ○ | ○ | ○ | ○ | ○ | ○ |
| Restoring property | ○ | ○ | ○ | ○ | × | × |
| Level of floor impact sounds | L-50 | L-55 | L-55 | L-60 | L-55 | L-55 |
| Impact resistance | 1 kg-50 cm 3/16 inch impulsive force | 1 kg-45 cm 3/16 inch impulsive force | 1 kg-45 cm 3/16 inch impulsive force | 1 kg-10 cm ½ inch impulsive force | 1 kg-50 cm 3/16 inch impulsive force | 1 kg-20 cm ½ inch impulsive force |

TABLE 2-continued

|  | Example 1 | Example 2 | Example 3 | Comparative Example 1 | Comparative Example 2 | Comparative Example 3 |
|---|---|---|---|---|---|---|
| Structure |  |  |  |  |  |  |
| 5: plywood 5.5 mm thickness |  |  |  |  |  |  |
| 2: Crosslinked viscoelastic body |  |  |  |  |  |  |
| 1': Film |  |  |  |  |  |  |

*[1] Poly BdR-45HT, trade name, made by Arco Chemical Corp.
*[2] Polyhardener D-350, trade name, made by Daiichi Kogyo Seiyaku K. K.
*[3] Rikabond PS-8000A, trade name, made by Chuo Rika Kogyo K. K.
*[4] Halcoat, trade name, made by Nippon Latex Kako K. K.
*[5] Diana process oil AH-16, trade name, made by Idemitsu Sekiyu Kagaku K. K.
*[6] U-rex 180EF, trade name, made by Tokyo Jushi Kogyo K. K.
*[7] YS Resin A-800, trade name, made by Yasuhara Yushi K. K.
*[8] 28% tin octylate, made by Nihon Kagaku Sangyo K. K.
*[9] Polyflex MH, trade name, made by Daiichi Kogyo Seiyaku K. K.
*[10] diphenylmethane-bis-4,4'-N,N'—diethylene urea

EXAMPLES 4 AND 5

A liquid rubber composition having a compounding recipe as shown in the following Table 3 was mixed with a crosslinking agent MDI, and then the resulting mixture was filled in holes of a perforated base material having a ratio of hole area to area of base material other than holes as shown in Table 3 and cured at room temperature and dried to form an impact-cushioning sheet.

The properties of the resulting impact-cushioning sheet were measured in the same manner as described in Example 1 to obtain results as shown in Table 3.

TABLE 3

|  | Example 4 | Example 5 |
|---|---|---|
| (part by weight) |  |  |
| <Liquid rubber composition> |  |  |
| Hydroxyl-terminated liquid polybutadiene rubber*[1] | 100 | 100 |
| Straight asphalt 60/80 | 100 | 100 |
| Plasticizer A*[2] | 200 | 200 |
| Tactifier*[3] | 50 | 50 |
| Mica |  |  |
| <Crosslinking agent> |  |  |
| MDI | 12 | 12 |
| Base material | Polyethylene foam | Nylon fiberboard |
| Thickness of base material (mm) | 4 | 4 |
| Ratio of hole area to area of base material other than hole | 6:4 | 6:4 |
| Shape retention at 80° C. | ○ | ○ |
| Hardness SRIS 0101 (20° C.) | 26 | 26 |
| Room temperature reactivity | presence | presence |
| Restoring property | ○ | ○ |
| Level of floor impact sounds | L-50 | L-45 |
| Impact resistance | 1 kg-50 cm | 1 kg-50 cm |

TABLE 3-continued

|  | Example 4 | Example 5 |
|---|---|---|
|  | 3/16 inch impulsive force | 3/16 inch impulsive force |
| Structure |  |  |
| 5: plywood 5.5 mm thickness |  |  |
| 2: Crosslinked viscoelastic body |  |  |
| 6: Base material |  |  |

*[1] Poly BdR-45HT, trade name, made by Arco Chemical Corp.
*[2] Diana process oil AH-16, trade name, made by Idemitsu Sekiyu Kaqaku K. K.
*[3] YS Resin A-800, trade name, made by Yasuhara Yushi K. K.

EXAMPLES 6-8, COMPARATIVE EXAMPLES 4-7

A liquid rubber composition having a compounding recipe as shown in the following Table 4 was mixed with a crosslinking agent as shown in Table 4, and then the resulting mixture was filled in concave portions of a film base having a ratio of convex portion to concave portion as shown in Table 4 and cured at room temperature and dried to form an impact-cushioning sheet.

In Comparative Example 4, a hot melt having a compounding recipe as shown in Table 4 was reacted at 100° C. and then melted by heating at 90° C., which was filled in holes of the film base.

Then, the resulting impact-cushioning sheet was used to form a direct-applying restraint type floor damping structure as shown in Table 4. The properties of the floor damping structure were measured in the same manner as described in Example 1 to obtain results as shown in Table 4.

TABLE 4

|  | Example | | | Comparative Example | | | |
|---|---|---|---|---|---|---|---|
|  | 6 | 7 | 8 | 4 | 5 | 6 | 7 |
| (part of weight) |  |  |  |  |  |  |  |
| (Liquid rubber composition) |  |  |  |  |  |  |  |
| Hydroxyl-terminated liquid polybutadiene rubber*[1] | 100 | — | 100 |  | 100 | 100 | 100 |
| Polyether polyol*[2] | — | 100 | — |  | — | — | — |
| Straight asphalt 60/80 | 100 | — | 100 |  | — | 100 | 100 |
| Plasticizer A*[3] | 200 | — | 200 |  | 50 | 200 | 200 |
| Plasticizer B*[4] | — | 200 | — |  | — | — | — |
| Tactifier*[5] | 50 | 30 | 50 |  | 30 | 50 | 50 |
| Calcium carbonate | — | 57 | — |  | — | — | — |
| Mica | 50 | — | 50 |  | 20 | 50 | 50 |
| Catalyst*[6] | — | 3 | — |  | — | — | — |
| (Crosslinking agent) |  |  |  |  |  |  |  |
| MDI | 12 | — | 12 |  | 15 | 12 | 12 |
| Isocyanate + prepolymer*[7] | — | 130 | — |  | — | — | — |
| (Hot melt) |  |  |  |  |  |  |  |
| Partly crosslinked butyl rubber*[8] |  |  |  | 100 |  |  |  |
| APP |  |  |  | 100 |  |  |  |
| Calcium carbonate |  |  |  | 50 |  |  |  |

TABLE 4-continued

|  | Example | | | Comparative Example | | | |
|---|---|---|---|---|---|---|---|
|  | 6 | 7 | 8 | 4 | 5 | 6 | 7 |
| Tactifier*9 |  |  |  | 250 |  |  |  |
| Plasticizer C*10 |  |  |  | 70 |  |  |  |
| Antioxidant*11 |  |  |  | 2 |  |  |  |
| Film base ratio of convex portion to concave portion | 5:5 | 5:5 | 5:5 | 5:5 | 5:5 | 1:9 | 9:1 |
| Hardness SRIS 0101 (20° C.) | 11 | 23 | 11 | 28 | 60 | 11 | 11 |
| Shape retention at 80° C. | O | O | O | x | O | O | O |
| Level of floor impact sounds | L-50 | L-50 | L-55 | L-65 | L-65 | L-55 | L-55 |
| Restoring property | O | O | O | x | O | x | x |
| Floor damping structure |  |  |  |  |  |  |  |

1: Impact-cushioning sheet
7: Woody single-layer flooring 5.5 mm thickness
8: Upper-side restraint plywood 2.5 mm thickness
9: restraint plywood 2.5 mm thickness
10: Foamed polyethylene 2 mm thickness
11: Floor concrete slab 150 mm

*1 Poly BdR-45HT, trade name, made by Arco Chemical Corp.
*2 Polyhardener D-350, trade name, made by Daiichi Kogyo Seiyaku K. K.
*3 Diana process oil AH-16, trade name, made by Idemitsu Sekiyu Kagaku K. K.
*4 U-rex 180EF, trade name, made by Tokyo Jushi Kogyo K. K.
*5 YS Resin #1150, trade name, made by Yasuhara Yushi K. K.
*6 28% tin octylate, made by Nihon Kagaku Sangyo K. K.
*7 Polyflex MH, trade name, made by Daiichi Kogyo Seiyaku K. K.
*8 AID #10, trade name, made by Esso Chemical K. K.
*9 YS Resin A-800, trade name, made by Yasuhara Yushi K. K.
*10 Diana process oil KL-1, trade name, made by Idemitsu Sekiyu Kagaku K. K.
*11 Antioxidant BHT, trade name, made by Sumitomo Chemical K. K.

As seen from Table 4, the direct-applying restraint type floor dumping structures of Examples 6–8 show excellent floor impact sound insulating properties and compression restoring property.

In Comparative Example 4, the viscoelastic body made from hot melt is not crosslinked, so that the performance of mitigating floor impact sounds is poor and the compressive strain is large. Therefore, the floor damping structure of Comparative Example 4 is unsuitable as a floor member.

In Comparative Example 5, the hardness of the crosslinked viscoelastic body is 60, which is outside the range defined in the invention, so that the performance of mitigating floor impact sounds is poor.

In Comparative Example 6, the ratio of convex portion to concave portion is 1:9, which is outside the range defined in the invention, so that the restoring property is somewhat poor and the material cost becomes high.

In Comparative Example 7, the ratio of convex portion to concave portion is 9:1, which is also outside the range defined in the invention, so that the restoring property is poor and the risk of causing the breakage of air chamber becomes undesirably high.

EXAMPLES 9–10, COMPARATIVE EXAMPLES 8–10

A liquid rubber composition having a compounding recipe as shown in the following Table 5 was mixed with a crosslinking agent MDI, and then the resulting mixture was filled in holes of a perforated base material having a ratio of hole area to area of base material other than holes as shown in Table 5 and cured at room temperature and dried to form an impact-cushioning sheet.

Then, the resulting impact-cushioning sheet was used to form a direct-applying restraint type floor damping structure as shown in Table 5. The properties of the floor damping structure were measured in the same manner as described in Example 1 to obtain results as shown in Table 5.

TABLE 5

|  | Example | | Comparative Example | | |
|---|---|---|---|---|---|
|  | 9 | 10 | 8 | 9 | 10 |
| (part by weight) |  |  |  |  |  |
| (Liquid rubber composition) |  |  |  |  |  |
| Hydroxyl-terminated liquid polybutadiene rubber*1 | 100 | 100 | 100 | 100 | 100 |
| Aniline derived polyol*2 | — | — | — | — | 30 |
| Straight asphalt 60/80 | 100 | 100 | 100 | 100 | 50 |
| Plasticizer A*3 | 200 | 200 | 200 | 200 | 50 |
| Tactifier*4 | 50 | 50 | 50 | 50 | 30 |
| Calcium carbonate | 100 | 100 | 100 | 100 | 140 |
| (Crosslinking agent) |  |  |  |  |  |
| MDI | 12 | 12 | 12 | 12 | 53 |
| Hole area (cm$^2$) | 0.8 | 0.8 | 29 | 7.1 | 0.8 |
| Base material | Polyethylene foam | Polypropylene fiberboard Polyethylene foam | Polypropylene fiberboard | Polyethylene foam | Felt |
| Thickness of base material (mm) | 5 | 4 | 3 | 25 | 5 |

TABLE 5-continued

|  | Example | | Comparative Example | | |
|---|---|---|---|---|---|
|  | 9 | 10 | 8 | 9 | 10 |
| Ratio of hole area to area of base material other than hole | 6:4 | 6:4 | 6:4 | 5:5 | 9:1 |
| Shape retention at 80° C. | O | O | O | O | O |
| Hardness SRIS 0101 (20° C.) | 26 | 26 | 26 | 26 | 74 |
| Room temperature reactivity | presence | presence | presence | presence | presence |
| Restoring property | O | O | x | x | O |
| Level of floor impact sounds | L-50 | L-45 | L-55 | L-60 | L-60 |
| Floor damping structure 7: Woody finish flooring 6: Base material 9: Restraint plywood 10: Foamed polyethylene 11: Floor concrete slab | | | | | |

*¹PolyBdR-45HT, trade name, made by Arco Chemical Corp.
*²Isonol 100, trade name, made by Kasei Up-John K. K.
*³Diana process oil AH-16, trade name, made by Idemistu Sekiyu Kagaku K. K.
*⁴YS Resin A-800, trade name, made by Yasuhara Yushi K. K.

As seen from Table 5, the floor damping structure of Example 9 shows good performance of mitigating floor impact sounds and compression properties as a floor member, and the floor damping structure of Example 10 shows a considerably excellent performance of mitigating floor impact sounds and good compression properties as a floor member because the polypropylene fiberboard and the polyethylene foamed body were used as two layer in the structure.

In Comparative Example 8, the ratio of hole area is outside the range defined in the invention, so that the compression strain becomes unfavorably large at the cut end portion.

In Comparative Example 9, the thickness of the perforated base material is outside the range defined in the invention, so that the compression strain is large, and the restoring property is poor, and the risk of causing the breakage of portions of the base material other than holes becomes high, and the effect of mitigating floor impact sounds is small.

In Comparative Example 10, the ratio of hole area and the hardness of the crosslinked viscoelastic body are outside the ranges defined in the invention, respectively, so that the effect of mitigating floor impact sounds is small.

As mentioned above, in the impact-cushioning sheet using the film base according to the invention, the impact cushioning and vibration damping performances can more efficiently be developed by utilizing compression properties of air enclosed in the convex portion of the film base and the crosslinked viscoelastic body and increasing the restraint area based on the complicated shape of the film base. Furthermore, the amount of the crosslinked viscoelastic body used is saved by using the film base having air chambers therein, so that the production cost can be reduced. Moreover, the heat insulating effect is obtained owing to the presence of air chambers. In addition, when the above sheet is used to provide a floor damping structure, the total thickness of the structure can be held thin to suppress the increase of eaves height in the building, resulting in the reduction of the building cost.

In the case of using the perforated base material made of fiberboard and/or foamed body, the floor impact sounds can be more mitigated by the synergistic action of the fiberboard or foamed body and the crosslinked viscoelastic body. The compression strain being a weak point of the fiberboard or foamed body can be reduced by utilizing the restoring property of the crosslinked viscoelastic body. Since the crosslinked viscoelastic body is filled in the holes of the perforated base material, the effective adhesion area of the crosslinked viscoelastic body can considerably be increased, and consequently the vibration energy is absorbed by the restraint effect against deformation based on impact and deviated deformation effect. Further, the use of cheap fiberboard or foamed body brings about the decrease of costs in view of the material and handling operation, so that the resulting sheet is used as a general-purpose floor damping structure. Even when the thickness of the floor damping structure is thin, sufficient effect of mitigating floor impact sounds can be obtained, resulting in the decrease of the building cost without rising the eaves height of the building. Moreover, the heat insulating effect can be expected by the use of the fiberboard or foamed body as a base material.

According to the invention, it is possible to perform woody floor finishing, which has strongly been demanded in the past, at a low cost by utilizing various merits as mentioned above. That is, the invention has considerably industrial merits.

What is claimed is:

1. An impact-cushioning sheet, comprising:
    a film base constituted by alternately arranging convex portions having air enclosed therein and concave portions made only of a film; and
    a crosslinked viscoelastic body filled in the concave portions of the film base and/or over the whole surface of the film base abd obtained by curing a viscoelastomeric substance at room temperature;
    said crosslinked viscoelastic body retaining its shape even when being warmed at 80° C. and having a hardness at 20° C. of not more than 50 as measured by a C-type hardness tester according to a standard SRIS-0101 in The Society of Rubber Industry, Japan, wherein a ratio of total air volume in the convex portions of the film base to total viscoelastic body volume filled in the concave portions of the film base is within a range of convex portion: concave portion of 2:8 to about 8:2, and a height of the convex portion is not more than 6 mm.

2. An impact-cushioning sheet, comprising:
    a perforated base material composed of fiberboard or foamed body, or a laminate thereof, having a hole area of 0.03 to about 13 cm² and a thickness of 2 to about 20 mm; and
    a crosslinked viscoelastic body filled in hole portions in said hole area and/or over the whole surface of the base material, and obtained by curing a viscoelastomeric substance at room temperature;

said crosslinked viscoelastic body retaining its shape even when being warmed at 80° C. and having a hardness at 20° C. of not more than 50 as measured by a C-type hardness tester according to a standard SRIS-0101 in The Society of Rubber Industry, Japan, wherein a rttio of total hole area to whole area of the base material other than the hole portions is within a range of 2:8 to about 8:2.

3. The impact-cushioning sheet according to claim 1, wherein said crosslinked viscoelastic body is obtained by curing a primary ingredient comprising a telechelic polymer having hydroxyl groups in its terminals with a crosslinking agent having two or more isocyanate groups per one molecule at room temperature.

4. The impact-cushioning sheet according to claim 1, wherein said crosslinked viscoelastic body is otained by curing a primary ingredient composed of hydroxyl-terminated liquid polybutadiene, asphalt and plasticizer with a crosslinking agent having two or more isocyanate groups per one molecule at room temperature.

5. A direct-applying resistant type floor damping structure, comprising an impact-cushioning sheet and a floor component part adhered to at least one surface of the sheet, said impact-cushioning sheet comprising:

a film base constituted by alternately arranging convex portions having air enclosed therein and concave portions made only of a film; and a crosslinked viscoelastic body filled in the concave portions of the film base and/or over the whole surface of the film base, and obtained by curing a viscoelastomeric substance at room temperature;

said crosslinked viscoelastic body retaining its shape even when being warmed at 80° C. and having a hardness at 20° C. of not more than 50 as measured by a C-type hardness tester according to a standard SRIS-0101 in The Society of Rubber Industry, Japan, wherein a ratio of total air volume in the convex portions of the film base to total viscoelastic body volume filled in the concave portions of the film base is within a range of convex portion: concave portion of 2:8 to about 8:2 and a height of the convex portion is not more than 6 mm.

6. A direct-applying restraint type floor damping structure, comprising an impact-cushioning sheet and a floor component part adhered to at least one surface of the sheet, said impact-cushioning sheet comprising:

a perforated base material composed of fiberboard or foamed body, or a laminate thereof, having a hole area of 0.03 to about 13 $cm^2$ and a thickness of 2 to about 20 mm; and a crosslinked viscoelastic body filled in the hole portions and/or over the whole surface of the base material, and obtained by curing a viscoelastomeric substance at room temperature;

said crosslinked viscoelastic body retaining its shape eve when being warmed at 80° C. and having a hardness of 20° C. of not more than 50 as measured by a C-type hardness tester according to a standard SRIS-0101 in The Society of Rubber Industry, Japan, wherein a ratio of total hole area to whole area of the base material other than the hole portions is within a range of 2:8 to about 8:2.

7. The direct-applying restraint type floor damping structure according to claim 5, wherein said crosslinked viscoelastic body is obtained by curing a primary ingredient comprising a telechelic polymer having hydroxyl groups in its terminalswith a crosslinking agent having two or more isocyanate groups per one molecule at room temperature.

8. The direct-applying restraint type floor damping structure according to claim 5, wherein said crosslinked viscoelastic body is obtained by curing a primary ingredient composed of hydroxyl-terminated liquid polybutadiene, asphalt and plasticizer with a crosslinking agent having two or more isocyanate groups per one molecule at room temperature.

9. The direct-applying restraint type floor damping structure according to claim 5, wherein said floor component part is a woody floor finishing member or a woody plate member.

* * * * *